United States Patent
Siddam (10) Patent No.: US 8,645,510 B2
(45) Date of Patent: Feb. 4, 2014

(54) METHOD OF DISTRIBUTING PCC RULES AMONG IP-CONNECTIVITY ACCESS NETWORK (IP-CAN) BEARERS

(75) Inventor: Kalyan Premchand Siddam, Nepean (CA)

(73) Assignee: Alcatel Lucent, Paris (FR)

( * ) Notice: Subject to any disclaimer, the term of this patent is extended or adjusted under 35 U.S.C. 154(b) by 491 days.

(21) Appl. No.: 12/784,056

(22) Filed: May 20, 2010

(65) Prior Publication Data

US 2011/0289196 A1    Nov. 24, 2011

(51) Int. Cl.
*G06F 15/173*    (2006.01)

(52) U.S. Cl.
USPC ......................................... 709/221

(58) Field of Classification Search
None
See application file for complete search history.

(56) References Cited

U.S. PATENT DOCUMENTS

| | | | |
|---|---|---|---|
| 6,895,485 B1 * | 5/2005 | DeKoning et al. | 711/170 |
| 2005/0122945 A1 * | 6/2005 | Hurtta | 370/338 |
| 2008/0046963 A1 * | 2/2008 | Grayson et al. | 726/1 |
| 2010/0017846 A1 * | 1/2010 | Huang et al. | 726/1 |
| 2010/0039941 A1 * | 2/2010 | Tan et al. | 370/241 |

OTHER PUBLICATIONS

"Policy Charging Control over Gx Reference Point," ETSI TS 129 212 V8.6.0. Jan. 2010.*
Zadeh et al., "Self-Organizing Packet Radio Ad Hoc Networks with Overlay (SOPRANO)." IEEE Communications Magazine. Jun. 2002.*

* cited by examiner

*Primary Examiner* — Scott Christensen
(74) *Attorney, Agent, or Firm* — Kramer Amado P.C.

(57) ABSTRACT

Various exemplary embodiments relate to a method and system for distributing policy and charging control (PCC) rules among a plurality of IP-Connectivity Access Network (IP-CAN) bearers. The method may include one or more of the following: receiving, at a PCRN, an UE request (CCR) message, processing the UE message to generate one or more PCC rules, determining one or more requested service data flows (SDFs) from the UE message, and for each requested SDF, generating a new PCC rule based on the UE message. The method may further include, providing each new PCC rule to a Policy and Charging Enforcement Node (PCEN), controlling distribution of the generated PCC rules among a plurality of IP-CAN bearers, and binding each requested service data flow to select ones of IP-CAN bearers of the plurality of IP-CAN bearers.

20 Claims, 9 Drawing Sheets

| | 505 | 510 | 515 | 520 | 525 |
|---|---|---|---|---|---|
| | Rule Name | Service Data Flow Filter | Flow Status | QoS Parameters | Changing Parameters |
| 530 | 0xE426 | 0x90F2CE32... | {Open; Open} | {8; 2kbps;8kbps} | {0.05/kb} |
| 535 | 0x99B2 | 0xB2B56FE1... | {Open; Open} | {6; 16kbps;16kbps} | {0.10/min} |
| 540 | ... | ... | ... | ... | ... |

METHOD OF DISTRIBUTING PCC RULES AMONG IP-CONNECTIVITY ACCESS NETWORK (IP-CAN) BEARERS

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provisioning, metering and charging, and user's quality of experience (QoE) assurance.

In an effort to simplify the dual core approach of the second and third generation networks, the 3rd Generation Partnership Project (3GPP) has recommended a new network scheme known as "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 23.203, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof. The 3GPP specification allows the PCC architecture to interwork with older generation networks (e.g., GPRS).

For example, 3GPP TS 29.212 and 3GPP TS 29.214 provide some guidance on the establishment of an application session by the EPC upon receipt of an application request from an application function (AF) in the form of an AA-Request (AAR) message or from a Packet Data Network Gateway (PGW) in the form of a Credit Control Request (CCR) message. The standards specify that the PCRF is responsible for receiving new application requests, creating new policy and charging control (PCC) rules commensurate with such requests, and providing these new PCC rules to the PCEF for installation. The 3GPP standards also define the format of application request messages and PCC rules.

The 3GPP standards do not, however, describe how the PCRF should interpret an application request or create PCC rules. Such functionality is desired for the operation of the EPC. Without an infrastructure to create appropriate PCC rules based on an application request, the EPC may not be able to establish application sessions, charge subscribers for application usage, or ensure that a certain QoE level is met in providing services. Further, for IP-CAN types (e.g., GPRS) that allow multiple IP-CAN bearers, bearer binding is desired for the PCC rule(s). Termination of IP-CAN bearers impacts resource usage on the PCEF and affects user experience.

In view of the foregoing, it would be desirable to provide a method for distributing impacted PCC rules among IP-CAN bearers to achieve better resource usage on the PCEF and also facilitate enhanced user experience.

SUMMARY

In light of the present need for a method and system for dynamically distributing PCC rules among IP-CAN bearers is described. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method for distributing policy and charging control (FCC) rules among a plurality of IP-Connectivity Access Network (IP-CAN) bearers, the method includes receiving, at a policy and charging rules node (PCRN), an application request (AR) message; processing the AR message to generate one or more PCC rules; determining one or more requested service data flows (SDFs) from the AR message; for each requested SDF, generating a new PCC rule based on the AR message; providing each new PCC rule to a Policy and Charging Enforcement Node (PCEN); controlling distribution of the generated PCC rules among a plurality of IP-CAN bearers; and binding each requested service data flow to select ones of the plurality of IP-CAN bearers.

In another aspect, a system for distributing policy and charging control (PCC) rules among a plurality of IP-Connectivity Access Network (IP-CAN) bearers is disclosed. The system includes a PCRN configured to process an application request to generate at least one policy and charging control (PCC) rule, the PCRN includes a first interface that receives the application request; a second interface that transmits policy and charging control rules to a policy and charging enforcement node (PCEN); an application request translator that translates the application request into at least one requested service data flow; a base rule generator that generates a new PCC rule for each requested service data flow of the at least one requested service flow; and an IP-CAN session manager that transmits each new PCC rule to the PCEN via the Gx interface for controlling distribution of the generated PCC rules among a plurality of IP-CAN bearers. The IP-CAN session manager may be configured to perform distribution of the generated PCC rules among one or more of the IP-CAN bearers.

In a further aspect, a machine-readable storage medium encoded with instructions for distributing policy and charging control (PCC) rules among a plurality of IP-Connectivity Access Network (IP-CAN) bearers, the machine-readable storage medium is disclosed.

It should be apparent that, in this manner, various exemplary embodiments enable redistribution of impacted PCC rules among IP-CAN bearers in order to achieve better resource usage on the PCEF and better user experience (e.g., by improved radio reception).

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
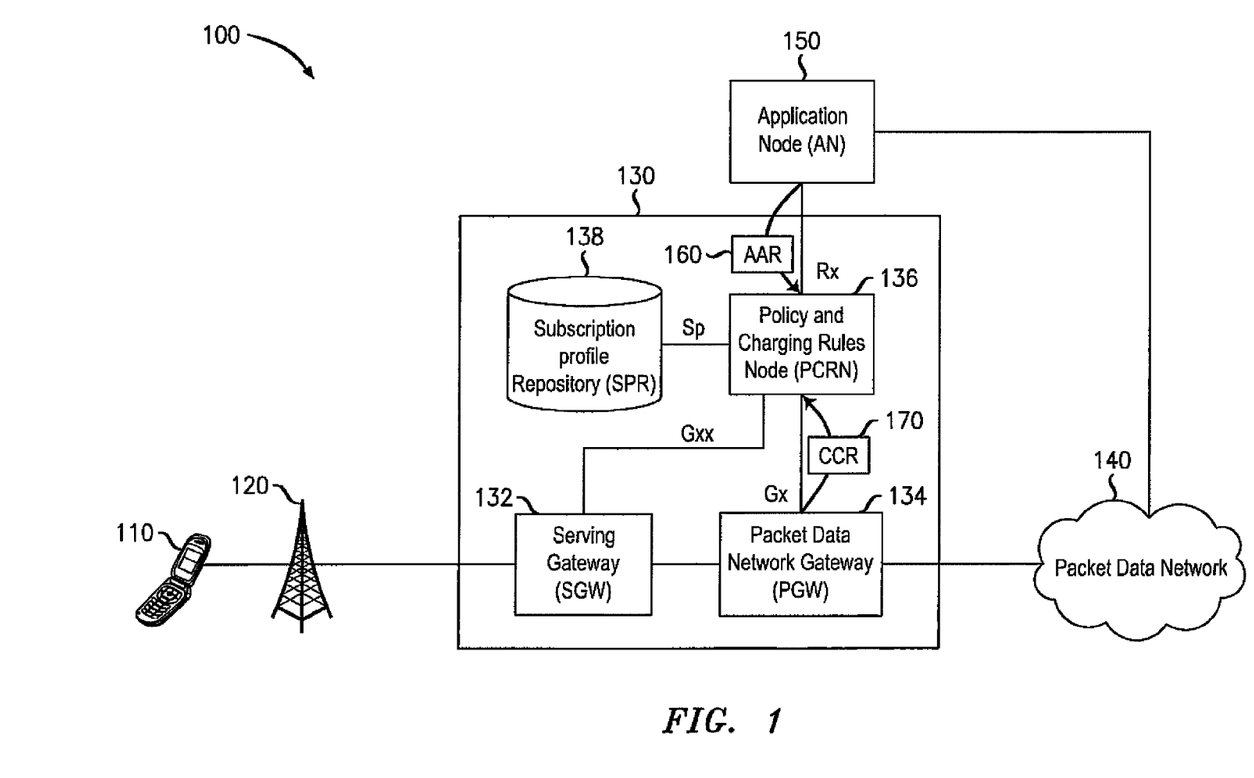
FIG. 1 illustrates an exemplary subscriber network for providing various data services.

FIG. 1 illustrates an exemplary subscriber network 100 for providing various data services. Exemplary subscriber network 100 may be a communications network, such as, for example, an LTE or GPRS mobile communications network, for providing access to various services. The network 100 may include user equipment 110, base station 120, packet core (PC) 130, packet data network 140, and application node (AN) 150.

User equipment 110 may be a device that communicates with packet data network 140 for providing an end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via packet core 130.

Base station 120 may be a device that enables communication between user equipment 110 and packet core 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with packet core 130 via a second medium, such as Ethernet cable. Base station 120 may be in direct communication with packet core 130 or may communicate via a number of intermediate nodes (not shown). In various embodiments, multiple base stations (not shown) may be present to provide mobility to user equipment 110. Note that in various alternative embodiments, user equipment 110 may communicate directly with packet core 130. In such embodiments, base station 120 may not be present.

Packet core (PC) 130 may be a device or network of devices that provides user equipment 110 with gateway access to packet data network 140. PC 130 may further charge a subscriber for use of provided data services and ensure that particular quality of experience (QoE) standards are met. Thus, PC 130 may be implemented, at least in part, according to the 3GPP TS 29.212, 29.213, and 29.214 standards. Accordingly, PC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the PC 130 to an end user of network 100. SGW 132 may be the first device within the PC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SOW 132 may include a Bearer Binding and Event Reporting Function (BBERF). In various exemplary embodiments, PC 130 may include multiple SGWs (not shown) and each SGW may communicate with multiple base stations (not shown)—for the sake of simplicity, a single SGW is shown in FIG. 1. It will, however, be appreciated that multiple SGWs are possible. In various embodiments, the SGW and PGW functionalities may be provided by either 4G or 3G network elements, depending on the mobile network. For example, in a 3G network PGW functionality may be provided by a Gateway GPRS Support Node (GGSN).

Packet data network gateway (PGW) 134 may be a device that provides gateway access to packet data network 140. PGW 134 may be the final device within the PC 130 that receives packets sent by user equipment 110 toward packet data network 140 via SGW 132. PGW 134 may include a Policy and Charging Enforcement Function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services. As will be described in further detail below with respect to FIG. 4, upon receiving a request for an unknown application service from UE 110, POW may construct a credit control request (CCR), such as, for example, CCR 170, requesting an appropriate allocation of resources and forward the request to PCRN 136.

Policy and charging rules node (PCRN) 136 may be a device that receives requests related to service data flows (SDFs) and IP-CAN sessions, generates PCC rules, and provides PCC rules to the PGW 134 and/or other PCENs (not shown). PCRN 136 may be in communication with AN 150 via an Rx interface. PCRN 136 may receive an application request in the form of an AA-request (AAR) 160 from AN 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. As described in further detail below with respect to FIG. 4, PCRN 136 may receive an application request in the form of a credit control request (CCR) 170 from SGW 132 or PGW 134. As with AAR 160, upon receipt of CCR 170, PCRN may generate at least one new PCC rule for fulfilling the application request 170. In various embodiments, AAR 160 and CCR 170 may represent two independent application requests to be processed separately, while in other embodiments, AAR 160 and CCR 170 may carry information regarding a single application request and PCRN 136 may create at least one PCC rule based on the combination of AAR 160 and CCR 170. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within PC 130. As will be described in further detail with reference to FIG. 5, data stored by SPR 138 may include an identifier of each subscriber and indications of subscription information for each subscriber such as, for example, bandwidth limits, charging parameters, and subscriber priority.

Packet data network 140 may be a network, such as, for example, internet or a network created of various communication devices, for providing data communications between user equipment 110 and other devices connected to packet data network 140, such as AN 150. Packet data network 140 may further provide, for example, phone and/or Internet service to various user devices in communication with packet data network 140.

Application node (AN) 150 may be a device that provides a known application service to user equipment 110. Thus, AN 150 may be a server or other device that provides, for example, a video streaming or voice communication service to user equipment 110. AN 150 may further be in communication with the PCRN 136 of the PC 130 via an Rx interface. When AN 150 is to begin providing known application service to user equipment 110, AN 150 may generate an application request message, such as an AA-Request (AAR) 160 defined by the Diameter protocol, to notify the PCRN 136 that resources should be allocated for the application service. This application request message may include information such as an identification of a subscriber using the application service and an identification of service data flows desired to be established in order to provide the requested service. AN 150 may communicate such an application request to the PCRN 136 via the Rx interface.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-5.

PCRN 136 may receive a request for establishment of a service data flow (SDF) such as, for example, AAR 160 and/or CCR 170. In attempting to establish the requested SDF, PCRN 136 may determine that there is a conflict between the request and a subscriber profile. For example, the request may specify that 512 kbps of bandwidth is requested while a subscriber record may indicate that the subscriber is only allowed to have 256 kbps of bandwidth. To resolve this conflict, PCRN 136 may locate an applicable behavioral rule that indicates that the request should be rejected. Subsequently, PCRN 136 may reject the request in accordance with the applicable rule.

According to various exemplary embodiments, user equipment 110 may communicate with AN 150 to indicate that user equipment 110 wishes to receive a known service provided by AN 150. Such communication may occur via PC 130 and packet data network 140 or via other communications channels (not shown). AN 150 may then construct an AAR 160 indicating the subscriber and the data flows necessary to provide the requested service. AN 150 may then forward the AAR 160 to the PCRN 136 via the Rx interface. Upon receipt of the AAR 160, PCRN 136 may generate a PCC rule for each flow indicated by the AAR 160 as necessary to providing the requested service. When generating each PCC rule, PCRN 136 may also take other information into account, such as subscriber data from SPR 138 and internally generated policy decisions. PCRN 136 may then transmit each new PCC rule to PGW 134 via the Gx interface for installation. After installation of the new PCC rules, PGW 134 may then allow data communication for each of the requested data flows while appropriately charging the subscriber and ensuring that a particular QoS is met.

PC 130 may also include a Mobility Management Entity MME (not shown in the figure) which can be a nodal element within the PC 130. MME performs signaling and control functions to manage User Equipment (UE) 110 access to network connections, assignment of network resources, and management of mobility states to support tracking, paging, roaming, handovers and such functions. MME may also perform control plane functions, the control plane is configured to address requirements for high scalability and high availability of secure mobility and connection management along with reliable and scalable network wide policy and subscriber management. MME also supports security procedures which may include end-to-end authentication as well as initiation and negotiation of ciphering and integrity protection algorithms, terminal-to-terminal session handling which includes signaling procedures used to set up packet data context and negotiate associated parameters like QoS, idle terminal location management.

In various embodiments, such as those including a PMIP deployment, SGW 132 may be at least partially responsible for ensuring that the necessary QoS is met. In such cases, PCRN 136 may also generate a matching QoS rule for each new PCC rule. PCRN 136 may then provide each new QoS rule to SDW 132 via the Gxx interface for installation.

It should be noted that, while the above example describes a network-initiated application request in the form of an AAR 160, the methods and devices described herein are also capable of responding to a UE-initiated application request in the form of a CCR 170.

Figure 2:
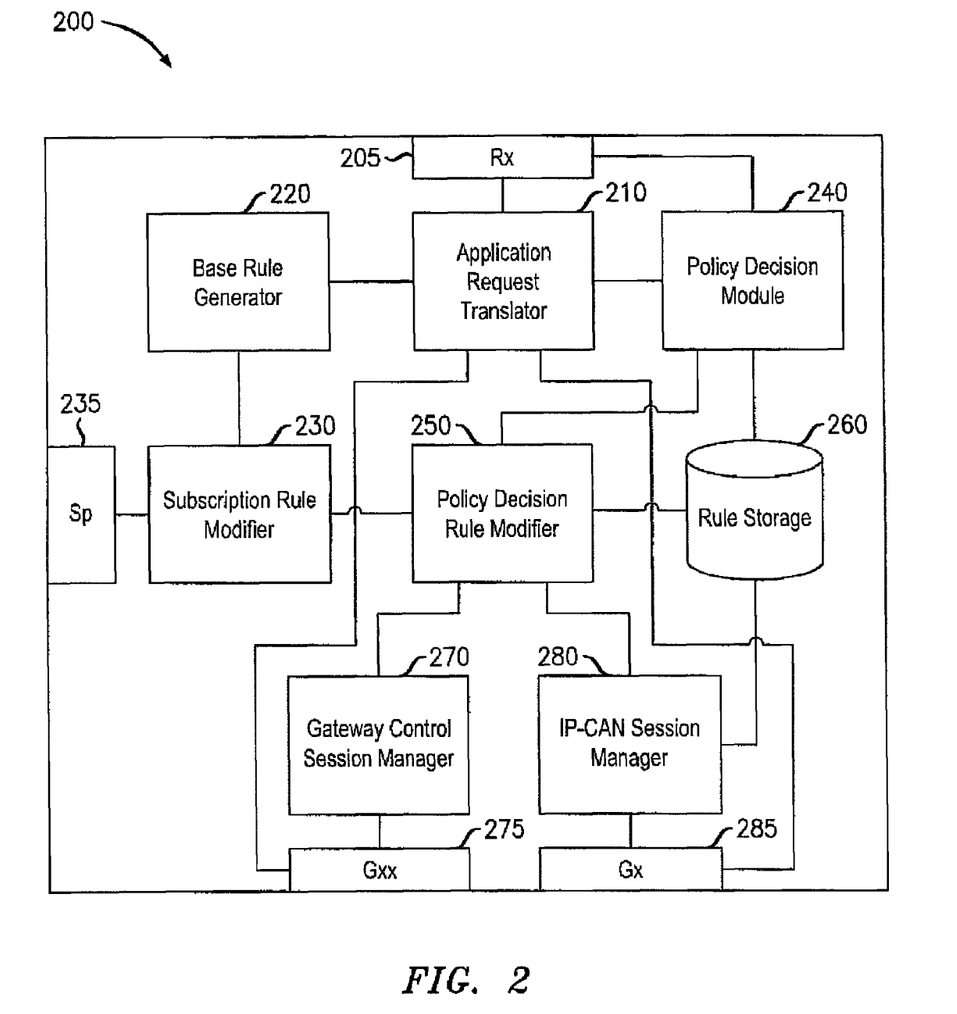
FIG. 2 illustrates an exemplary policy and charging rules node (PCRN) for creating new policy and charging control (PCC) rules in response to application requests.

FIG. 2 illustrates an exemplary policy and charging rules node (PCRN) 200 for creating new policy and charging control (PCC) rules in response to application requests. PCRN 200 may correspond to PCRN 136 of exemplary subscriber network 100. PCRN 200 may include an Rx interface 205, application request translator 210, base rule generator 220, subscription rule modifier 230, Sp interface 235, policy decision module 240, policy decision rule modifier 250, rule storage 260, gateway control session manager 270, Gxx interface 275, IP-CAN session manager 280, and Gx interface 285.

Rx interface 205 may be an interface comprising hardware and/or executable instructions encoded on a machine-readable storage medium configured to communicate with an AN such as AN 150. Such communication may be implemented according to the 3GPP TS 29.214. Specifically, Rx interface 205 may receive an application request (AAR) from AN 150.

Application request translator 210 may include hardware and/or executable instructions on a machine-readable storage medium configured to determine from an application request, whether it be an AAR, CCR, or combination thereof, what service data flows will be necessary to provide a requested service. As will be described in greater detail below with respect to FIGS. 3-4, an application request may identify a number of streams needed to provide the requested service. Application request translator 210 may then generate a service flow object to represent each requested data stream. Each service flow object may include information described by the application request such as, for example, requested bandwidth, packet filter, subscriber identifier, and/or data stream type. Application request translator 210 may then pass each service flow object to base rule generator 230 for further processing.

Base rule generator 220 may include hardware and/or executable instructions on a machine-readable storage medium configured to generate a new PCC rule based on a received application request and/or a service flow object generated by the application request translator 210. Base rule generator may first generate a new PCC rule object. Next, base rule generator 220 may generate a name for the new PCC rule and store it in the PCC rule object. The PCC rule name may be generated according to any method known to those of skill in the art such as, for example, incrementing a previously assigned rule name or generating a random name. Base rule generator 220 may also insert other data into the PCC rule object, including information ascertained from the AAR, CCR, and/or service flow object such as, for example, bandwidth, flow status, and/or flow descriptors. At this point, the new PCC rule may be a valid rule ready for installation or may require further modification before it will function properly upon installation. Base rule generator may then pass the PCC rule object to subscription rule modifier 230 for further processing.

Subscription rule modifier 230 may include hardware and/or executable instructions on a machine-readable storage medium configured to modify a PCC rule object based on subscription information. Subscription rule modifier 230 may first receive a PCC rule object, service flow object, CCR, and/or AAR and determine a subscription ID associated with the request. Subscription rule modifier 230 may then retrieve a subscription profile record from an SPR via Sp interface 235. The accessed SPR may correspond to SPR 138 and may be an external node or a component of PCRN 200. Using this subscription profile record, subscription rule modifier 230 may modify the PCC rule object according to subscriber-specific data. For example, subscription rule modifier 230 may modify the bandwidth of the PCC rule object according to maximum allowed bandwidths stated in the subscription profile record. As another example, subscriber rule modifier 230 may set charging parameters in the PCC rule object according to the information stored in the subscription profile record to indicate how much money the subscriber is to be charged for each metered activity unit for the service. Other subscription-specific modifications to the new PCC rule object will be apparent to those of skill in the art. After all modifications to the FCC rule object are complete, subscription rule modifier 230 may pass the PCC rule object on to the policy decision rule modifier 250.

Sp interface 235 may be an interface comprising hardware and/or executable instructions encoded on a machine-readable storage medium configured to communicate with a SPR such as SPR 138. Thus, Sp interface 235 may transmit record requests and receive subscription profile records.

Policy decision module 240 may include hardware and/or executable instructions on a machine-readable storage medium configured to perform a policy decision regarding an application request received via the Rx interface 205, Gxx interface 275, and/or Gx interface 285. Such policy decision may occur concurrently with the operation of application request translator 210. Policy decision module 240 may utilize policy decision rules stored in rules storage 260 or elsewhere (not shown) to generate a policy decision for the application request. In generating a policy decision, policy decision module 240 may also take into account subscriber data retrieved from an SPR such as SPR 138 and/or data related to an existing application session. A policy decision result may include information such as values for charging parameters, QoS parameters, service identifiers, rating groups, online or offline charging method, metering method, reporting level, and/or allocation retention priority. Policy decision module 240 may then forward these policy decision results to policy decision modifier 250.

Policy decision rule modifier 250 may include hardware and/or executable instructions on a machine-readable storage medium configured to modify a PCC rule object based on policy decision results generated by policy decision module 240. For example, policy decision rule modifier 250 may insert information such as charging parameters, QoS parameters, service identifiers, rating groups, online or offline charging method, metering method, reporting level, and/or allocation retention priority into the PCC rule object. Policy decision rule modifier 250 may further determine a QoS Class Identifier (QCI) for the PCC rule. This may be accomplished, for example, by referring to a mapping table that correlates a media type specified by the AAR to a QCI. From the QCI and bandwidths provided in the application request, policy decision rule modifier 250 may determine additional and/or alternative QoS parameters to be inserted into the PCC rule object. Policy decision rule modifier 250 may then store the PCC rule object as a new PCC rule in rule storage 260 and forward the new PCC rule to IP-CAN session manager 280 for installation. In various embodiments utilizing gateway control sessions to provide QoS assurance, such as an embodiment utilizing PMIP, policy decision rule modifier 250 may also forward the new PCC rule to gateway control session manager 270.

Rule storage 260 may be any machine-readable medium capable of storing PCC rules generated by the PCRN 200. Accordingly, rule storage 260 may include a machine-readable storage medium such as read-only memory (ROM), random-access memory (RAM), magnetic disk storage media, optical storage media, flash-memory devices, and/or similar storage media. As will be described in further detail below with respect to FIG. 5, rule storage 260 may store definitions of numerous PCC rules created by PCRN 200. Such definitions may include, for example, rule names, service data flow filters, QoS parameters, and charging parameters.

Gateway control session manager 270 may include hardware and/or executable instructions on a machine-readable storage medium configured to generate and transmit QoS rules for installation at an SGW or other node implementing a gateway control session. In various embodiments utilizing gateway control sessions to provide QoS assurance, such as an embodiment utilizing PMIP, gateway control session manager 270 may extract information necessary to generate a QoS rule from a PCC rule. For example, gateway control session manager 270 may extract the rule name, service data flow filter, and QoS parameters from a PCC rule and generate a new QoS rule. Gateway control session manager 270 may then forward the new QoS rule to an SGW or other appropriate node via Gxx interface 275.

Gxx interface 275 may be an interface comprising hardware and/or executable instructions encoded on a machine-readable storage medium configured to communicate with a SGW such as SGW 132. Such communication may be implemented according to the 3GPP TS 29.212. Thus, Gxx interface 275 may receive requests for QoS rules and transmit QoS rules for installation. Gxx interface 275 may further receive UE-originated application requests in the form of a CCR.

IP-CAN session manager 280 may include hardware and/or executable instructions on a machine-readable storage medium configured to transmit a new PCC rule to a PGW or other node implementing a PCEF. IP-CAN session manager 280 may receive a new PCC rule and immediately forward it to a PGW or other node via Gx interface 285. IP-CAN session manager 280 may perform additional functionality such as, for example, receiving requests for rules via Gx interface 285 and responding by retrieving the requested rule from rule storage 260 and transmitting it via the Gx interface 285. The PCRF implemented by the PCRN 136 cooperates with IP-CAN session manager 280 to distribute PCC rules among one or more IP-CAN bearers. In the embodiments described herein, bearer binding is defined as the association of a PCC rule to an IP-CAN bearer.

Gx interface 285 may be an interface comprising hardware and/or executable instructions encoded on a machine-readable storage medium configured to communicate with a PGW such as PGW 134. Such communication may be implemented according to the 3GPP TS 29.212. Thus, Gx interface 285 may receive requests for PCC rules and transmit PCC rules for installation. Gx interface 285 may further receive UE-originated application requests in the form of a CCR, such as CCR 170.

Figure 3:
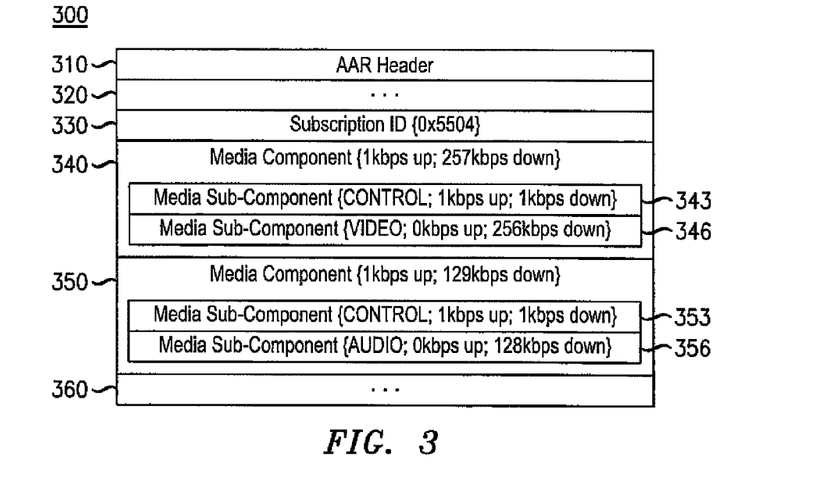
FIG. 3 illustrates an exemplary network-originated application request message.

FIG. 3 illustrates an exemplary network-originated application request message in the form of an AAR 300. AAR 300 may be constructed according to the Diameter message protocol and/or 3GPP TS 29.214. Accordingly, AAR 300 may include a header 310, subscription ID field 330, media component fields 340, 350, and a number of additional fields 320, 360. Note that the order of the fields of AAR 300 may vary. Thus, for example, subscription ID field 330 may be located after media component fields 340, 350.

Header 310 may be a standard Diameter header indicating that message 300 is an AAR. Thus, header 310 may include a command code field set to a value of 265 and the R-bit field of the command flags field set, as provided for by the Diameter protocol and 3GPP TS 29.214.

Subscription ID field 330 may be an attribute-value pair (AVP) for indicating a subscription that is associated with the particular request. For example, subscription ID field 330 indicates that the subscription identified by the value "0x5504" is associated with AAR 300. This information may be used to access a subscription profile record and charge the appropriate subscriber in relation to the requested service.

Media component fields 340, 350 may contain service information related to each media component of a requested service. In the example of AAR 300, the request may be for a streaming video. Media component 340 may correspond to the video portion of the stream while media component 350 may correspond to the audio portion of the stream. Each media component may carry further description such as, for example, the requested bandwidth for each portion of the stream. Thus, media component 340 may request 1 kbps upstream and 257 kbps downstream for the video portion while media component 350 may request 1 kbps upstream and 129 kbps downstream for the audio portion.

Media component fields 340, 350 may further include media sub-components 343, 346, 353, 356, each indicating an independent data stream necessary for providing the requested service. Thus, media sub-component 343 may indicate that a control stream having bandwidth of 1 kbps upstream and 1 kbps downstream is necessary for providing a streaming video. Likewise, media sub-component 346 may indicate that a video stream having 256 kbps downstream bandwidth is also necessary for a streaming video. Media-subcomponents 353, 356 may similarly indicate that a control stream having 1 kbps bandwidth in both directions and an audio stream having 128 kbps downstream are necessary for providing the audio component of the streaming video.

Additional fields 320, 360 may include additional information as specified by the Diameter protocol and/or 3GPP TS 29.214. Thus, additional fields 320, 360 may include additional attribute value pairs (AVPs) such as the Origin-Host AVP, Destination-Host AVP, Supported-Features AVP, Framed-IP-Address AVP, etc. Additional fields 320, 260 may be used in extracting other useful information such as, for example, flow identifying information.

Figure 4:
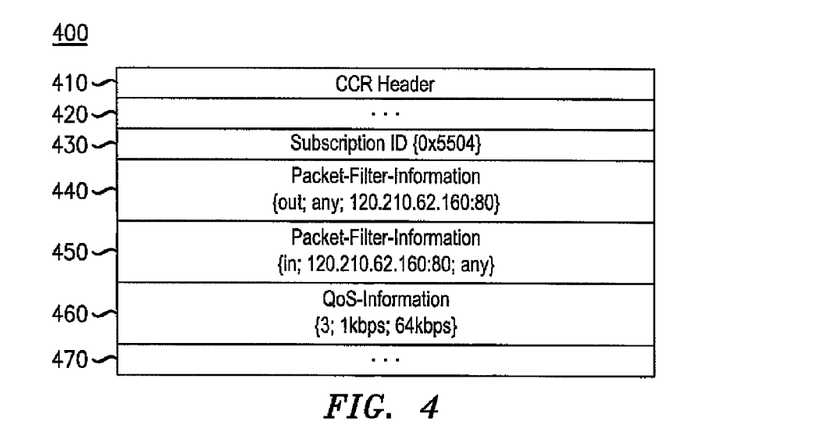
FIG. 4 illustrates an exemplary user equipment-originated application request message.

FIG. 4 illustrates an exemplary user equipment-originated application request message in the form of a CCR 400. CCR 400 may be constructed according to the Diameter message protocol and/or 3GPP TS 29.212. Accordingly, CCR 400 may include a header 410, subscription ID field 430, packet filter information fields 440, 450, QoS information field 460, and a number of additional fields 420, 470. Note that the order of the fields of CCR 400 may vary. Thus, for example, subscription ID field 430 may be located after packet filter information fields 440, 450, or QoS information field 460.

Header 410 may be a standard Diameter header indicating that message 400 is a CCR. Thus, header 410 may include a command code field set to a value of 258 and the R-bit field of the command flags field set, as provided for by the Diameter protocol and 3GPP TS 29.212.

Subscription ID field 430 may be an attribute-value pair (AVP) for indicating a subscription that is associated with the particular request. For example, subscription ID field 430 indicates that the subscription identified by the value "0x5504" is associated with CCR 400. This information may be used to access a subscription profile record and charge the appropriate subscriber in relation to the requested service.

Packet filter information fields 440, 450 may contain service information related to each requested flow for the requested service. In various embodiments, such as those implementing LTE for example, packet filter information fields 440, 450 may be Packet-Filter-Information AVPs. In various embodiments, such as those implementing GPRS for example, packet filter information fields 440, 450 may be TFT-Packet-Filter-Information AVPs. In the example of CCR 400, the request may be, for example, for HTTP server traffic. Packet filter information field 440 may describe a downstream flow, as indicated by the 'out' value, for traffic destined for IP address 120.210.62.160 on port 80 from any source. Likewise, packet filter information field 450 may describe an upstream flow, as indicated by the 'in' value, for traffic sent from IP address 120.210.62.160 on port 80 to any destination. Packet filter information fields 440, 450 may contain additional information such as, for example, a type of service, traffic class, and/or flow label.

QoS information field 460 may contain requested QoS settings for the requested service flows. For example, QoS information field 460 may indicate that the flows requested by CCR 400 should have an allocation retention priority of 3 and a maximum bandwidth of 1 kbps upstream and 64 kbps downstream. QoS information field 460 may contain additional information such as, for example, a QCI, guaranteed bandwidths, and/or a bearer identifier.

In various exemplary embodiments, PCRN 200 may not use QoS information field 460 to determine QoS values when generating a PCC rule. In such embodiments, a PGW such as PGW 134 may include QoS information within the packet filter information fields and PCRN 200 may use this information in the generation of a PCC rule instead.

Additional fields 420, 470 may include additional information as specified by the Diameter protocol and/or 3GPP TS 29.212. Thus, additional fields 420, 470 may include additional attribute value pairs (AVPs) such as the CC-Request-Type AVP, Framed-IP-Address AVP, 3GPP-SGSN-Address AVP, etc. Additional fields 420, 470 may be used in extracting other useful information such as, for example, flow identifying information.

Figure 5:
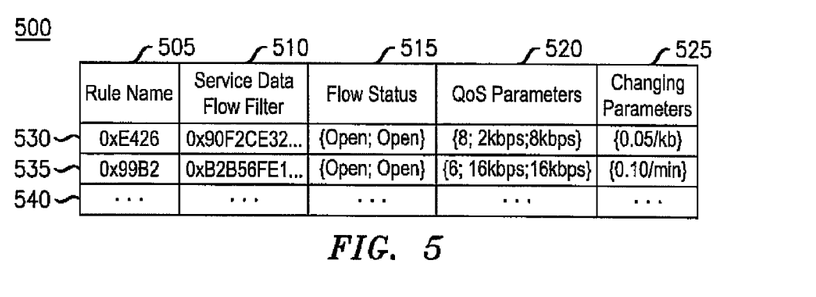
FIG. 5 illustrates an exemplary data arrangement for storing PCC rules.

FIG. 5 illustrates an exemplary data arrangement 500 for storing PCC rules. Data arrangement 500 may be, for example, a table in a database stored in rule storage 260. Alternatively, data arrangement 500 could be a series of linked lists, an array, or a similar data structure. Thus, it should be apparent that data arrangement 400 is an abstraction of the underlying data; any data structure suitable for storage of this data may be used.

Data arrangement 500 may include a rule name field 505, service data flow filter field 510, flow status field 515, QoS parameters field 520, charging parameters field 525. Data arrangement 500 may include additional fields (not shown) required or useful in defining a PCC rule such as, for example, a service identifier field, a precedence field, and/or a monitoring key field.

Rule name field 505 may be used to uniquely identify each PCC rule. Service data flow filter field 510 may be used to store a filter for selecting the traffic to which the PCC rule applies. Flow status field 515 may be used to determine whether traffic detected by the associated filter should be forwarded or dropped in the upstream and downstream direction. QoS parameters field 520 may be used to store QoS related information such as the QCI, allocation and retention priority, and authorized bitrates for uplink and downlink. Charging parameters field 525 may be used to indicate a charging key, metering method, whether offline or online charging should be used, and/or how much is to be charged per metered activity unit.

As an example, record 530 indicates that the rule identified by the name "0xE426" is applicable to traffic identified by using the filter "0x90F2CE32 . . . " Traffic in both directions should be forwarded according to a QCI of 8, allowing 2 kbps upstream and 8 kbps downstream, and the subscriber is to be charged $0.05 per kilobyte transferred.

As another example, record 535 indicates that the rule identified by the name "0x99B2" is applicable to traffic identified by using the filter "0xB2B56FE1 . . . ." Traffic should be forwarded in both directions according to a QCI of 6, allowing 16 kbps upstream and downstream, and the subscriber is to be charged $0.10 per minute of service use. Data arrangement 500 may contain numerous additional PCC rule records 540.

Figure 6:
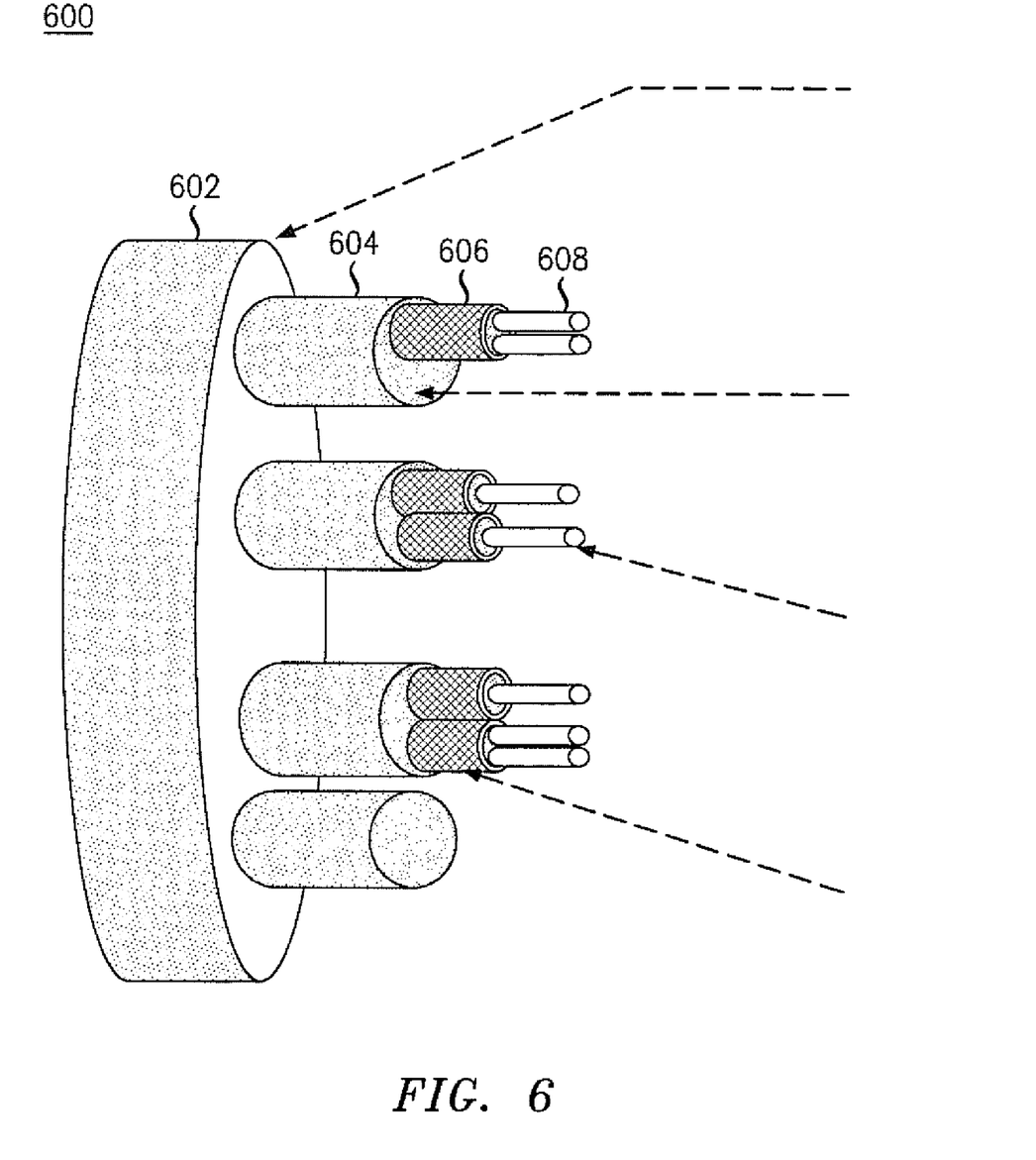
FIG. 6 illustrates an exemplary high level schematic of an IP-CAN session and service data flow carried by bearers and PCC rules that bind each of the bearers.

FIG. 6 illustrates an exemplary high level schematic 600 of an IP-CAN session and service data flows (SDFs) carried by bearers or IP-CAN bearers and binding of PCC rules to select IP-CAN bearers in accordance with various embodiments. Schematic 600 includes an IP-CAN session 602, a plurality of IP-CAN bearers 604, a plurality of PCC rules 606, and a plurality of service data flows (SDFs) 608. Schematic 600 illustrates an exemplary IP-CAN session with four IP-CAN bearers 604 and five PCC rules. Each IP-CAN bearer has a bandwidth it can accommodate to carry SDFs 608. The SDFs are distributed across various IP-CAN bearers 604 based on PCC rules 606. Each of the SDFs is bound to an IP-CAN bearer with specific quality of service (QoS). For the sake of simplicity, a limited number of IP-CAN sessions, IP-CAN bearers, PCC rules, and SDFs are shown—it will be appreciated that these limited numbers are exemplary only and that more or less number of these items are possible.

Figure 7:
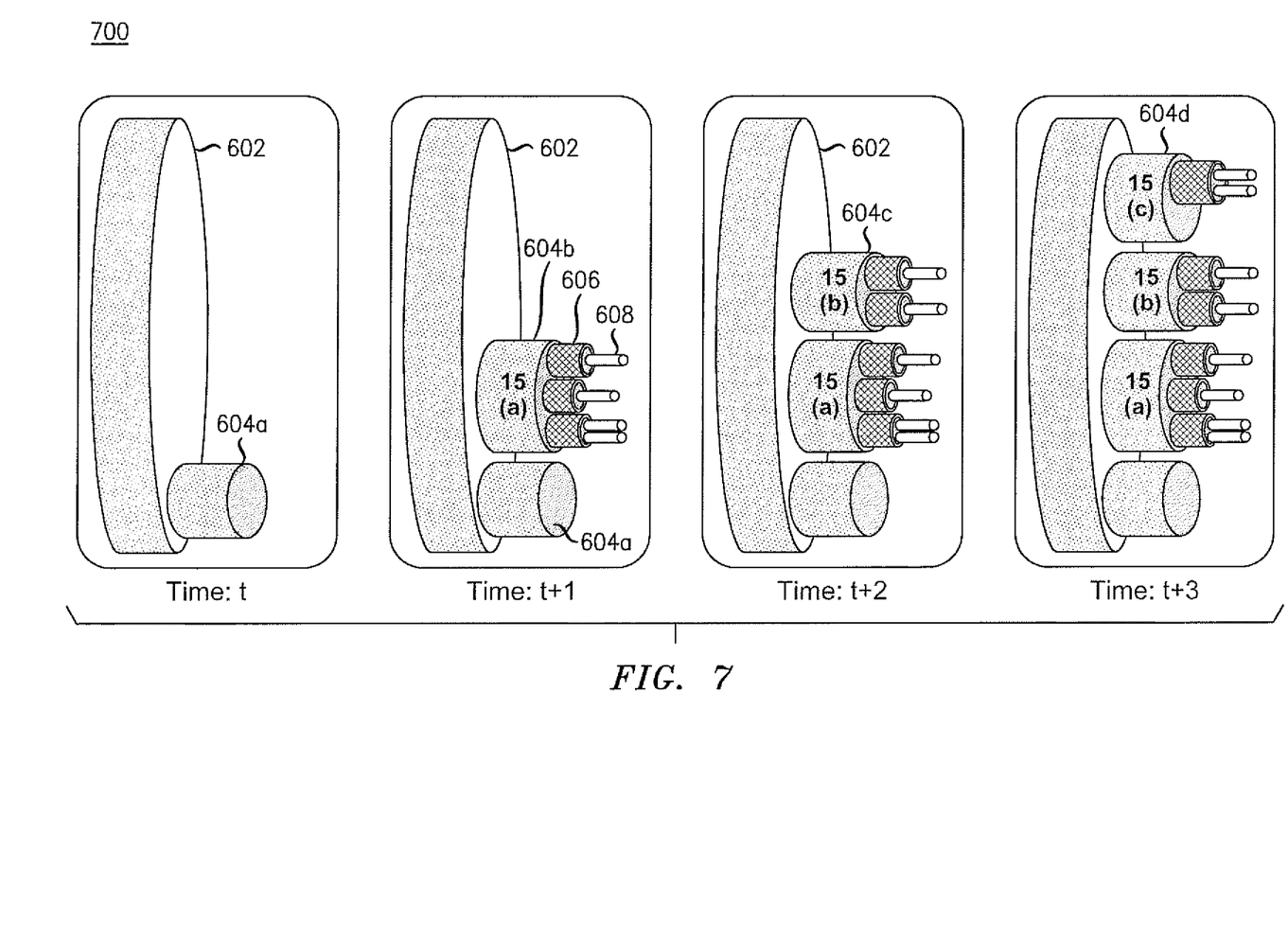
FIG. 7 illustrates an exemplary schematic of an IP-CAN session and initial distribution of PCC rules across IP-CAN bearers.

FIG. 7 illustrates an exemplary schematic 700 of an IP-CAN session 702 and initial distribution of PCC rules across IP-CAN bearers. More specifically, schematic 700 shows an IP-CAN session 602 wherein a plurality of SDFs 608 from a subscriber are established over a period of time and distributed among a plurality of IP-CAN bearers 604. In the exemplary schematic 700, a plurality of PCC rules, that govern distribution of SDFs, are shown to be distributed among three IP-CAN bearers. The distribution of the PCC rules may depend on how a user equipment (UE) such as, for example, a cellular phone, has requested establishment of SDFs. Service Data Flows (SDFs) are also alternately referred to herein as service flows or IP service flows. When bearer binding is performed by PCRN, the PCRN may move the SDFs between active IP-CAN bearers when one or more IP-CAN bearers are terminated.

Continuing to refer to FIG. 7, schematic 700 shows snapshots of an IP-CAN session at various time periods t, t+1, t+2, and t+3. At a time t, a single IP-CAN bearer 604a is shown in the IP-CAN session 602. At a time t+1, a second IP-CAN bearer 604b has been established and is shown to have a bandwidth capacity of 15 Mbps as indicated by the number 15 in 604b. The IP-CAN bearer 604b also shows three PCC rules 606, each having a bandwidth capacity of 4 Mbps, 2 Mbps, and 5 Mbps, respectively, and each of the PCC rules is shown to have SDFs 608 governed by the PCC rules. At a time t+2, an additional IP-CAN bearer 604c is added to the IP-CAN session 602. IP-CAN bearer 604c has a plurality of PCC rules having a bandwidth capacity of 2 Mbps, and 1 Mbps, respectively. At a time t+3, a further IP-CAN bearer 604d is added to the IP-CAN session 602 and has a PCC rule having a bandwidth capacity of 5 Mbps. The total bandwidth capacity of the PCC rules of all the IP-CAN session 602 at a time t+3 is 19 Mbps.

Figure 8:
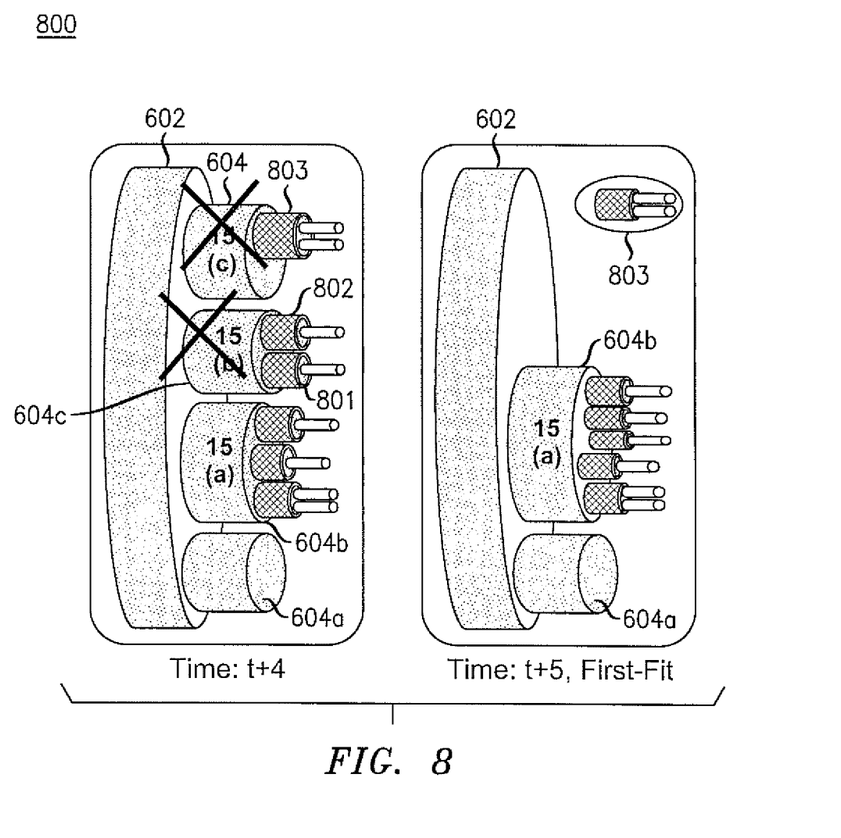
FIG. 8 illustrates a schematic of an IP-CAN session shown in FIG. 7 with redistribution of PCC rules across IP-CAN bearers using a First-Fit approach.

FIG. 8 illustrates a schematic 800 of an IP-CAN session 602 shown in FIG. 7 with redistribution of PCC rules across IP-CAN bearers using a First-Fit approach when a plurality of IP-CAN bearers are terminated at a time t+4. IP-CAN bearers 604c and 604d of IP-CAN session 602 are terminated at a time t+4 thereby impacting PCC rules 801, 802 of IP-CAN session 604c and PCC rule 803 of IP-CAN session 604d. The PCRN then moves the impacted PCC rules 801, 802, 803 to active IP-CAN bearers (e.g., 604b in FIG. 8) that can accommodate the impacted PCC rules using a First Fit approach. The snapshot at a time t+5 shows PCC rule redistribution to accommodate impacted PCC rules among active IP-CAN bearers. For example, the IP-CAN bearer 604b has a bandwidth capacity of 15 Mbps and at a time t+4, PCC rules governing SDFs having a bandwidth capacity of 11 Mbps (5+2+4) have been used. Thus, the IP-CAN bearer 604b has 4

Mbps of remaining bandwidth that can be used to accommodate impacted PCC rules of IP-CAN bearers 604c and 604d. Thus, at a time t+5 and identified as "t+5, First-Fit", PCC rules 801 and 802 are redistributed to be carried by IP-CAN bearer 604b taking its total bandwidth capacity to 14 Mbps. PCC rule 803 could not be moved for redistribution due to lack of available IP-CAN bearer bandwidth at IP-CAN bearer 604b.

Figure 9:
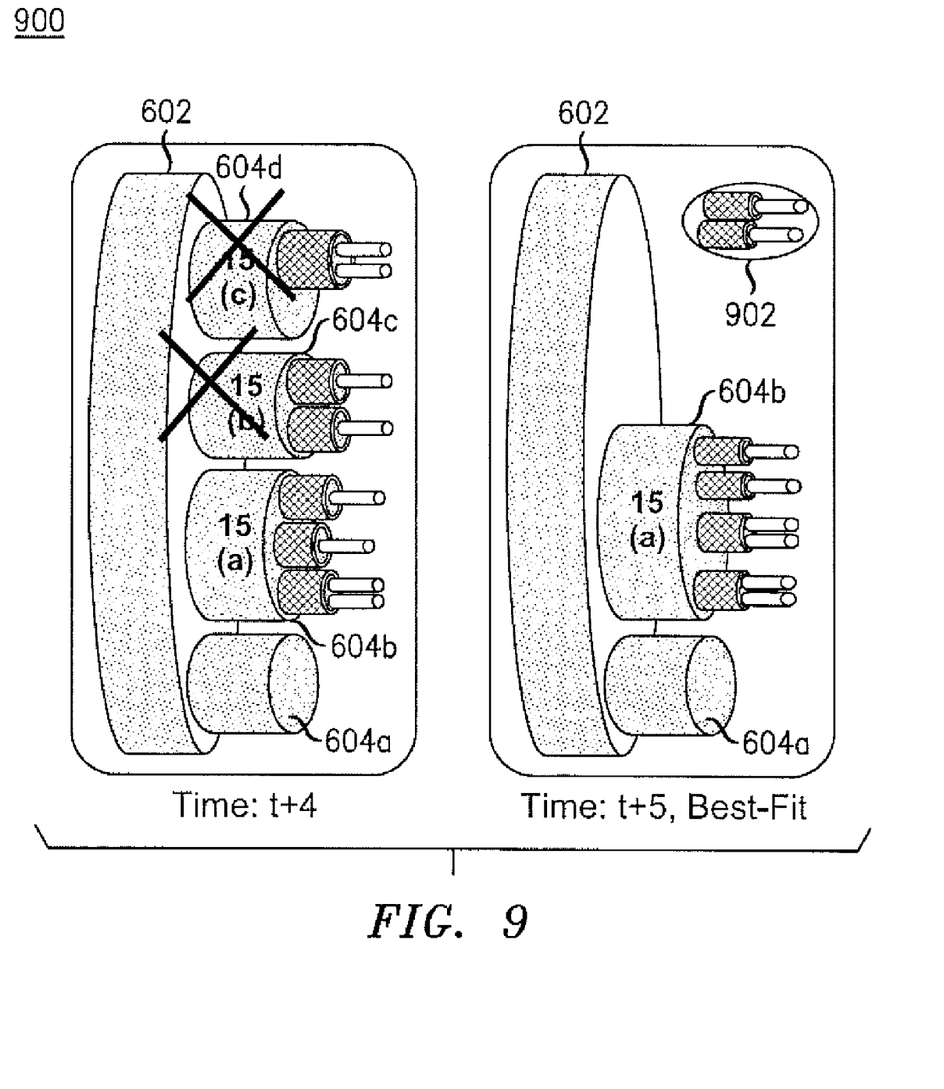
FIG. 9 illustrates a schematic of an IP-CAN session shown in FIG. 7 with redistribution of PCC rules across IP-CAN bearers using a Best-Fit approach.

FIG. 9 shows a snapshot 900 of redistribution of impacted PCC rules at a time t+4 shown in FIG. 8 and using a Best Fit approach. Redistribution of the impacted PCC rules is shown at a time t+5 and labeled as "t+5, Best-Fit". In the Best-Fit approach, PCC rules of an IP-CAN session (for example, 602 in the example embodiment shown), at a time when one or more IP-CAN bearers are terminated, are redistributed among active IP-CAN bearers so as to utilize maximum bandwidth capacity of the active IP-CAN bearers. In the example shown in FIG. 9, maximum bandwidth capacity of the IP-CAN bearer 604b is 15 Mbps and upon redistribution of PCC rules from a time t+4, sum of PCC rules bound to the IP-CAN bearer 604b is 15 Mbps, and thus, there is no unused IP-CAN bearer capacity for IP-CAN bearer 604b at a time t+5. PCC rules that could not be moved or redistributed due to lack of available IP-CAN bearer bandwidth are shown using reference numeral 902.

Figure 10:
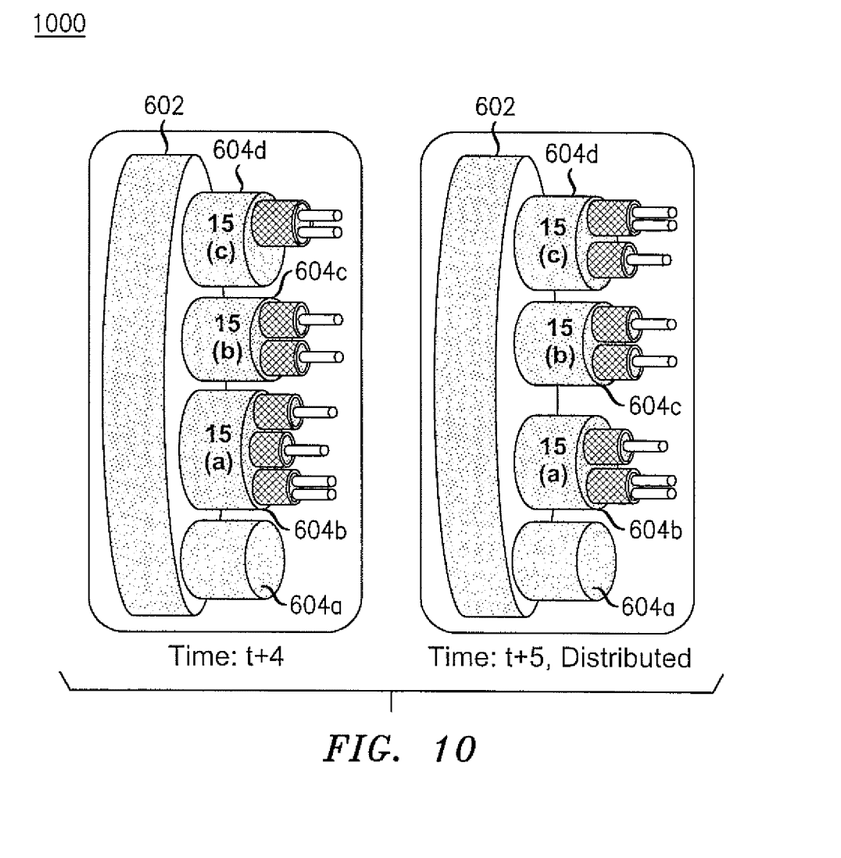
FIG. 10 illustrates a schematic of an IP-CAN session shown in FIG. 7 with redistribution of PCC rules across IP-CAN bearers using a Distributed approach.

FIG. 10 illustrates a schematic 1000 of an IP-CAN session shown in FIG. 7 with redistribution of PCC rules across IP-CAN bearers using a Distributed approach. Distribution of PCC rules for IP-CAN session 602 shown at a time t+4 is identical to the distribution shown at a time t+3 of FIG. 7. An external input (e.g., radio errors) may trigger requesting of redistribution of all PCC rules shown at a time t+4. The PCRN redistributes all the PCC rules among available IP-CAN bearers using a distributed approach so as to obtain an approximately even distribution of PCC rules among the IP-CAN bearers. The distributed method shown in FIG. 10 can be extended to be built using a 3GPP SON framework.

Figure 11:
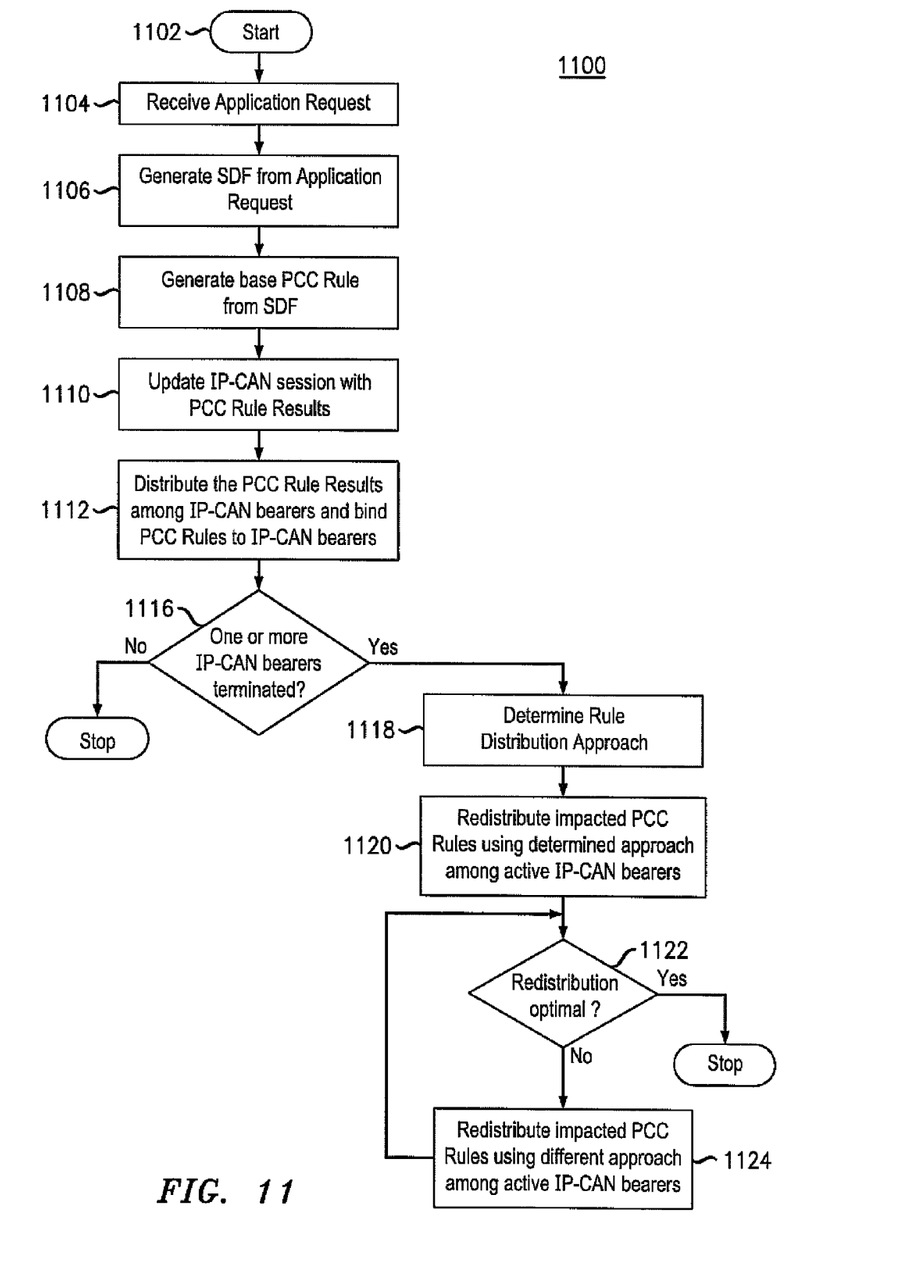
FIG. 11 illustrates an exemplary method for redistribution of PCC rules across IP-CAN bearers.

FIG. 11 illustrates an exemplary method 1100 for redistribution of PCC rules across IP-CAN bearers.

The method 1100 begins at step 1102 and proceeds to 1104 where PCRN 136, 200 receives an application request such as CCR 170, 400. Application request translator 210 may then extract media components 340, 350 from the application request and create four service flow objects corresponding to each media sub-component 343, 346, 353, 356: SFO1, SFO2, SFO3, and SFO4, respectively. Thus, SFO1 may indicate a video-control flow having 1 kbps bandwidth in both directions; SFO2 may indicate a video-stream flow having 256 kbps bandwidth in the downstream direction; SFO3 may indicate an audio-control flow having 1 kbps bandwidth in both directions; and SFO4 may indicate an audio-stream flow having 128 kbps bandwidth in the downstream direction. As described above, SDFs are generated from AR as indicated at a step 1106. Base rule generator 220 may then create a base rule for SFO1 in step 1108. This base rule may include information such as, for example, a rule name, the requested bandwidths, and service flow parameters. Thus, base rule generator 220 may generate a name for the new PCC rule such as, for example, "0xF30F." Base rule generator 220 may also insert the requested maximum bandwidths of 1 kbps upstream and downstream into the QoS portion of the new PCC rule. Base rule generator 220 may further infer that the flow status of the PCC rule should set the flow status to OPEN in both directions. Base rule generator 220 may also generate a service data flow filter, such as "0xDD3E5323 . . . ," for identifying the traffic to which the new PCC rule will apply. Base rule generator 220 may perform further operations in order to more fully define the new PCC rule. Thus, base rule generator 220 may be a fully functional or partially functional PCC rule.

At a step 1110, an IP-CAN session is updated with generated PCC rules. At a step 1112, the generated PCC rules and the SDFs governed by respective PCC rules are distributed among IP-CAN bearers and the PCC rules are bound to respective IP-CAN bearers. At step 1116, the PCRN 136, 200 may determine if one or more IP-CAN bearers have been terminated. For example, the PCRN 136, 200 may receive an indication that a bearer has been lost by another node, such as SGW 132 or PGW 134. In step 1118, PCRN 136, 200 may determine what rule distribution approach should be used. For example, PCRN 136,200 may determine what approach is appropriate from the context by using a policy decision function and/or what approach an operator or user has previously configured the PCRN 136,200 to use. Redistribution of impacted PCC rules to one or more active IP-CAN bearers may then be performed at step 1120. Redistribution may then be performed according to the determined approach. In various embodiments, method 1100 may end here, while in other embodiments, method 1100 may proceed to step 1122 to attempt distribution optimization. Step 1122 determines if the redistribution according to the First-Fit approach is optimal. If the redistribution is not optimal, redistribution of the impacted PCC rules is performed using a Best-Fit approach as indicated at a step 1124.

According to the foregoing, various exemplary embodiments provide for binding of PCC rules among IP-CAN bearers and redistribution of impacted PCC rules among active IP-CAN bearers for better resource usage on the PCEF and therefore providing for enhanced user experience, has been described.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN) for distributing policy and charging control (PCC) rules among a plurality of IP-Connectivity Access Network (IP-CAN) bearers, the method comprising:
   determining, by the PCRN, at least one PCC rule to be provided to a policy and charging enforcement node (PCEN);
   providing each PCC rule of the at least one PCC rule to the PCEN;
   selecting a rule distribution approach from a plurality of rule distribution approaches;
   controlling, by the PCRN, distribution of the at least one PCC rule among a plurality of IP-CAN bearers based on the selected rule distribution approach; and
   binding each distributed PCC rule of the at least one PCC rule to a select one of the IP-CAN bearers of the plurality of IP-CAN bearers.

2. The method of claim 1, further comprising:
   determining if one or more IP-CAN bearers have been terminated; and
   redistributing impacted PCC rules using a first approach among active IP-CAN bearers.

3. The method of claim 2, further comprising, before the step of redistributing, determining from a configuration of the PCRN that the first approach should be used.

4. The method of claim 2, further comprising:
   determining if the redistribution of the impacted PCC rules using the first approach is at a desired value; and
   if the redistributing using the first approach is not at the desired value, performing redistribution of the impacted PCC rules using a second approach.

5. The method of claim 1, wherein each of the IP-CAN bearers carries one or more requested service data flows, and each of the IP-CAN bearers include a plurality of segments that constitute an end-to-end IP-CAN bearer.

6. The method of claim 5, wherein the plurality of segments comprise a first segment located between a user equipment and a base station, a second segment located between the base station and a serving gateway (SOW), and a third segment located between the SOW and a packet data gateway network (POW), wherein the PGW controls QoS for each of the requested SDFs while the SGW controls dynamic management of the IP-CAN bearers.

7. The method of claim 1, wherein the step of determining, by the PCRN, at least one PCC rule to be provided to the PCEN comprises:
   receiving, at the PCRN, a request message; and
   generating the at least one PCC rule based on the request message.

8. The method of claim 1, wherein the selected rule distribution approach is a First-Fit approach.

9. The method of claim 1, wherein the selected rule distribution approach is a Best-Fit approach.

10. The method of claim 1, wherein the step of controlling distribution is further based on an external input from a component of a Self-Organizing Network (SON).

11. A system for distributing policy and charging control (PCC) rules among a plurality of IP-Connectivity Access Network (IP-CAN) bearers, the system comprising a policy and charging rules node (PCRN) configured to process an application request to generate at least one policy and charging control (PCC) rule, the PCRN having:
   an interface configured to communicate with a policy and charging enforcement node (PCEN);
   an IP-CAN session manager including a processor configured to:
      transmit at least one policy and charging control (PCC) rule to the PCEN via the interface for controlling distribution of the generated PCC rules among a plurality of IP-CAN bearers based on a rule distribution approach selected from a plurality of rule distribution approaches, wherein the IP-CAN session manager is configured to perform distribution of the at least one PCC rule to one or more of the IP-CAN bearers.

12. The system of claim 11, wherein the PCRN is further configured to bind a requested service data flow to a respective IP-CAN bearer of the plurality of IP-CAN bearers.

13. The system of claim 11, further comprising an application request translator configured to translate the application request into at least one requested service data flow, including determining, for each packet filter information section, a requested service flow from the packet filter information section.

14. The system of claim 11, wherein the selected rule distribution approach is one of a First-Fit approach and a Best-Fit approach.

15. A method performed by a policy and charging rules node (PCRN) for performing bearer binding, the method comprising:
   determining, by the PCRN, that bearer binding should be performed with respect to a set of policy charging and control (PCC) rules and a set of bearers;
   in response to determining that bearer binding should be performed, determining a first rule distribution approach of a plurality of rule distribution approaches to apply to the set of PCC rules;
   for each PCC rule of the set of PCC rules, selecting a bearer of the set of bearers to which the PCC rule should be bound based on the first rule distribution approach; and
   sending an indication to at least one other network device of a bearer of the set of bearers selected for a PCC rule of the set of PCC rules.

16. The method of claim 15, wherein the step of determining comprises:
   receiving, at the PCRN, a request message; and
   generating the set of PCC rules based on the request message.

17. The method of claim 15, wherein the step of determining comprises:
   receiving, at the PCRN, an indication that a bearer has been terminated; and
   identifying, as the set of PCC rules, one or more PCC rules previously bound to the bearer that has been terminated.

18. The method of claim 15, wherein the step of selecting a bearer of the set of bearers to which the PCC rule should be bound based on the first rule distribution approach comprises:
   iterating through the set of bearers; and
   selecting a first bearer encountered that can accommodate the PCC rule.

19. The method of claim 15, wherein the step of selecting a bearer of the set of bearers to which the PCC rule should be bound based on the first rule distribution approach comprises:
   selecting a bearer of the set of bearers such that a greatest possible bandwidth capacity of the set of bearers will be utilized.

20. The method of claim 15, further comprising:
   determining that a distribution of PCC rules among the set of bearers is not optimal;
   in response to determining that a distribution of PCC rules among the set of bearers is not optimal, determining a second rule distribution approach to apply to the PCC rules; and
   redistributing the PCC rules among the set of bearers based on the second rule distribution approach.

* * * * *

UNITED STATES PATENT AND TRADEMARK OFFICE
CERTIFICATE OF CORRECTION

| | |
|---|---|
| PATENT NO. | : 8,645,510 B2 |
| APPLICATION NO. | : 12/784056 |
| DATED | : February 4, 2014 |
| INVENTOR(S) | : Kalyan Premchand Siddam |

Page 1 of 1

It is certified that error appears in the above-identified patent and that said Letters Patent is hereby corrected as shown below:

In the Claims

Col. 15, line 38, replace the text "SOW" with the text -SGW-

Col. 15, line 39, replace the text "SOW" with the text -SGW-

Col. 15, line 40, replace the text "POW" with the text -PGW-

Signed and Sealed this
Twenty-second Day of April, 2014

Michelle K. Lee
*Deputy Director of the United States Patent and Trademark Office*